United States Patent
Maedako et al.

(10) Patent No.: US 11,476,787 B2
(45) Date of Patent: *Oct. 18, 2022

(54) INVERTER TYPE ENGINE GENERATOR

(71) Applicant: Honda Motor Co., Ltd., Tokyo (JP)

(72) Inventors: Minoru Maedako, Wako (JP); Toshio Inoue, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 61 days.

This patent is subject to a terminal disclaimer.

(21) Appl. No.: 17/263,816

(22) PCT Filed: Aug. 31, 2018

(86) PCT No.: PCT/JP2018/032385
§ 371 (c)(1),
(2) Date: Jan. 27, 2021

(87) PCT Pub. No.: WO2020/044545
PCT Pub. Date: Mar. 5, 2020

(65) Prior Publication Data
US 2021/0297031 A1 Sep. 23, 2021

(51) Int. Cl.
*H02P 27/08* (2006.01)
*H02K 7/18* (2006.01)
*H02P 9/02* (2006.01)

(52) U.S. Cl.
CPC ........... *H02P 27/08* (2013.01); *H02K 7/1807* (2013.01); *H02P 9/02* (2013.01)

(58) Field of Classification Search
CPC .......... H02P 27/08; H02P 9/02; H02K 7/1807
See application file for complete search history.

(56) References Cited

U.S. PATENT DOCUMENTS

2012/0074912 A1* 3/2012 Namai ................. H02M 7/493
322/39
2017/0272023 A1* 9/2017 Ahmed ............... H02M 5/4585

FOREIGN PATENT DOCUMENTS

| EP | 2383881 A1 | 11/2011 |
| JP | H11196599 A | 7/1999 |
| JP | 2001119928 A | 4/2001 |
| JP | 2008532473 A | 8/2008 |
| JP | 2010035258 A | 2/2010 |

OTHER PUBLICATIONS

India Office Action; Application 202147011704; dated Jun. 30, 2021.
International Search Report; Application PCT/JP2018/032385; dated Nov. 6, 2018.

* cited by examiner

Primary Examiner — Sean Gugger
(74) Attorney, Agent, or Firm — Duft & Bornsen, PC

(57) ABSTRACT

An inverter type engine generator includes an alternator; and a converter composed of the a three-phase rectifying bridge circuit including an upper and lower three sets of elements, and converting three-phase alternating current output from the alternator into direct current. The upper and lower three sets of elements of the three-phase rectifying bridge circuit of the converter are configured such that upper elements are configured at least from duty-controllable diode elements, and lower elements are configured at least from duty-controllable switching elements having diodes.

7 Claims, 8 Drawing Sheets

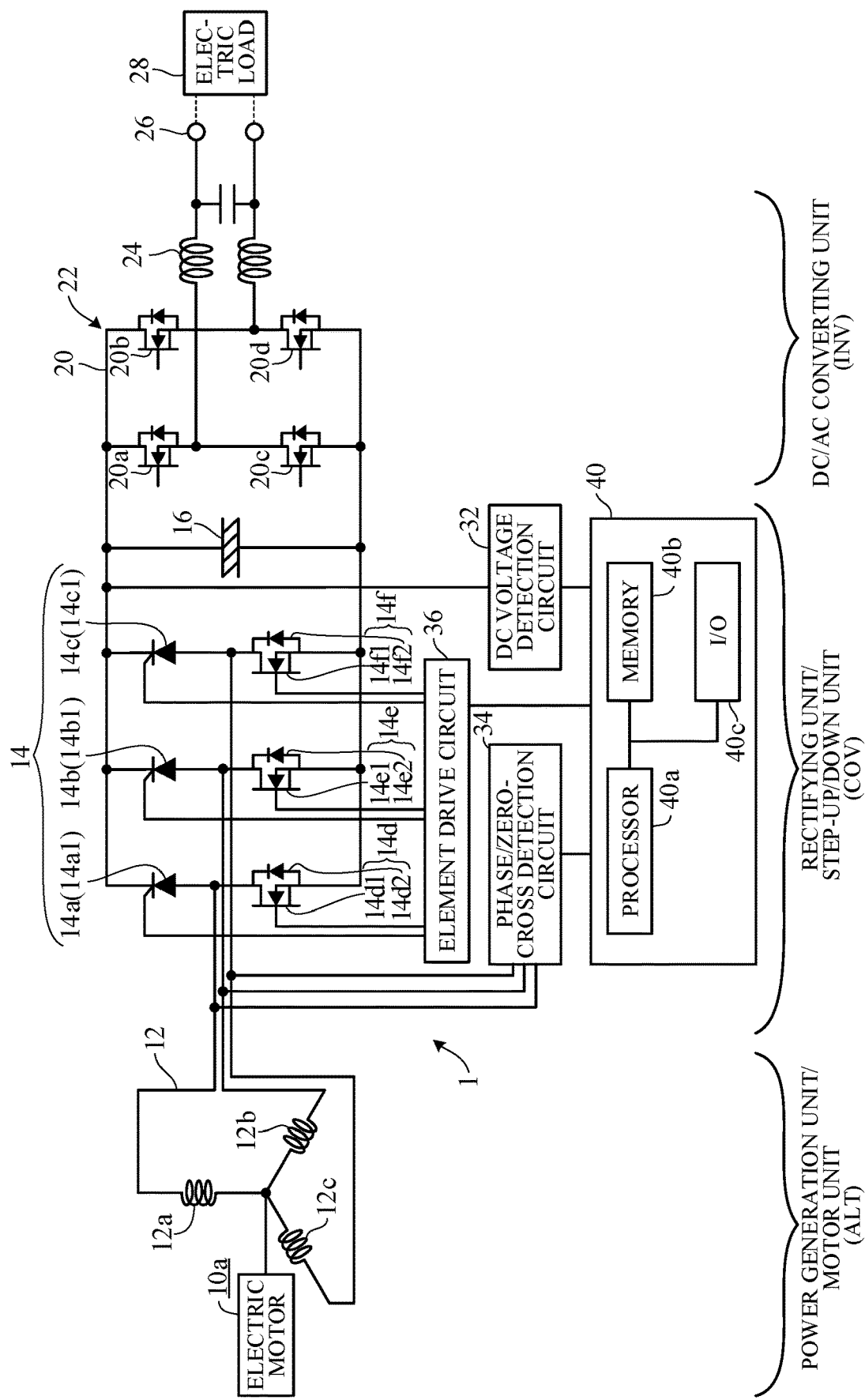

INVERTER TYPE ENGINE GENERATOR

TECHNICAL FIELD

This invention relates to an inverter type engine generator, more specially, a generator having a weight and size portable by a user and supplying electric power suitably to an electric load for agricultural work or outdoor activity such as camping, and so on.

BACKGROUND ART

In this type of generator, as described in Patent Literature 1 described below, a mixed bridge circuit of a thyristor and a diode is used when rectifying the three-phase AC voltage output from an alternator, and the rectification is performed while decreasing the voltage to a constant voltage by controlling the firing angle of the thyristor.

CITATION LIST

Patent Literature

Patent Literature 1: Japanese Unexamined Patent publication No. 2010-35258

DISCLOSURE OF INVENTION

Problems to be Solved by the Invention

The configuration doesn't need to set a DC step-up/down circuit after the rectification compare to a normal full-wave rectifying circuit, but since the configuration has only a step-down function, it is necessary to set generation voltage of an alternator higher in advance at each rotation speed, thereby the configuration causes an inconvenience with significant limitations in terms of characteristics, structure, and withstand voltage.

It is an object of the present invention to provide an inverter type engine generator which solves the above-described problems and realizes a rectifying circuit and a step-up/down circuit by a single three-phase bridge circuit.

Means for Solving Problem

According to the present invention, in order to solve the above problem, in an inverter type engine generator which includes an alternator having three-phase windings and driven by a rotary motor to generate power, a converter composed of a three-phase rectifying bridge circuit having upper and lower three sets of elements and converting a three-phase alternating current output from the alternator into a direct current, and a converter control unit configured to control driving of the elements of the three-phase rectifying bridge circuit so that a direct-current terminal voltage output from the converter becomes a target voltage, the upper and lower three sets of elements of the three-phase rectifying bridge circuit of the converter are configured such that upper elements are configured at least from duty-controllable diode elements, and lower elements are configured at least from duty-controllable switching elements having diodes.

BRIEF DESCRIPTION OF THE DRAWINGS

FIG. 11 is an electric circuit diagram showing an inverter type engine generator according to according to a second embodiment of the present invention as a whole.

DESCRIPTION OF EMBODIMENT

Hereinafter, an inverter type engine generator according to an embodiment of the present invention is explained with reference to attached figures.

First Embodiment

Figure 1:
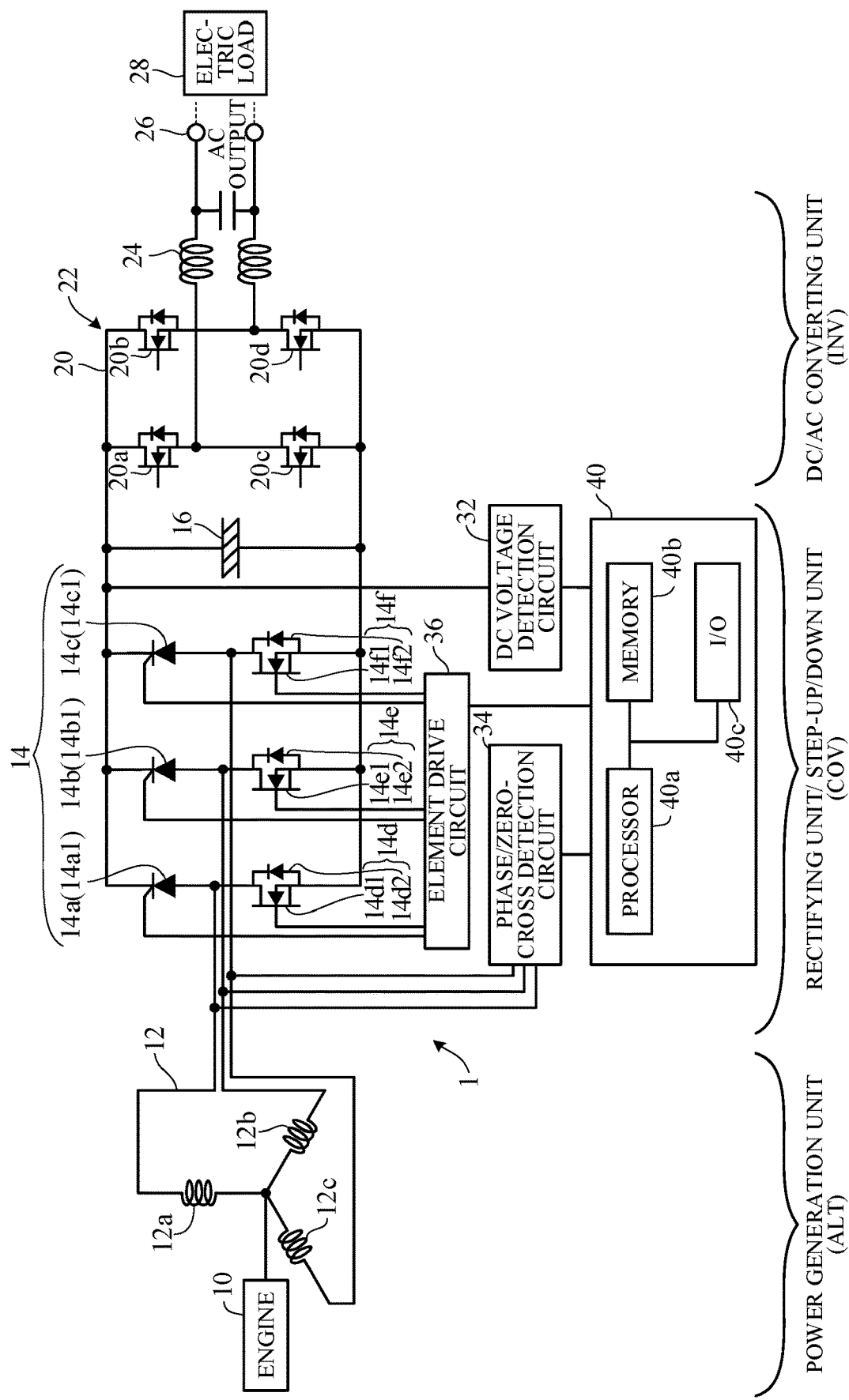
FIG. 1 is an electric circuit diagram showing an inverter type engine generator according to a first embodiment of the present invention.

FIG. 1 is an electric circuit diagram generally showing an inverter type engine generator according to a first embodiment of the present invention.

An inverter type engine generator (hereinafter referred to as "generator" and indicated by reference numeral 1) comprises a generator having a weight and size portable by a user and supplying electric power suitably to an electric load for agricultural work or outdoor activity such as camping, and so on.

As shown in the figure, a generator 1 is provided with and an inverter unit 22 which includes an alternator (ALT. power generation unit) 12 which is driven by a general-purpose engine (rotary motor) 10 to generate power, a converter 14 electrically connected to the alternator 12 and converting (rectifying) three-phase alternating current output from the alternator 12 into direct current, a capacitor 16 electrically connected between a positive-side terminal and a negative-side terminal of the converter 14 and smoothing the direct current rectified by the converter 14, and an inverter 20 electrically connected to the capacitor 16 and converting the direct current smoothed by the capacitor 16 into alternating current.

The inverter unit 22 is connected through a waveform shaping circuit 24 and an output terminal 26 to an electric load 28 for agricultural work or the like described above.

The general-purpose engine (hereinafter referred to as "engine") 10 is an ignition-type air-cooled engine using, for example, gasoline as fuel and has a piston reciprocating in a cylinder, and a crankshaft (output shaft) rotating in synchronization with the piston. Power of the engine 10 is output to the alternator 12 via the crankshaft.

The alternator 12 has UVW three-phase windings 12a, 12b, 12c, and is composed of a multipole alternator which is rotationally driven by the engine 10 to generate AC power. Although not shown in the drawing, the multipole alternator includes a rotor which is connected to the crankshaft of the engine 10 and is composed of a permanent magnet rotating integrally with the crankshaft, and a stator arranged on the peripheral surface of the rotor, and a large number of poles which are composed of UVW three-phase windings 12a, 12b, 12c arranged at every 120 degrees of phase angles as shown in the drawing are formed in the stator.

To describe the configuration of the converter 14 and the like of the inverter unit 22 in detail, the converter 14 is composed of a three-phase rectifying bridge circuit having upper and lower three sets of three pairs (six pieces in total) of elements 14a to 14f connected corresponding to the U-phase, V-phase, and W-phase windings of the alternator 12.

In this embodiment, with respect to the upper and lower three sets of elements 14a to 14f of the three-phase rectifying bridge circuit, the upper elements 14a, 14b, 14c are configured at least from duty-controllable diode elements (for example, thyristors) 14a1 to 14c1, and the lower elements 14d, 14e, 14f are configured at least from duty-controllable switching elements with diodes (for example, FETs (Field Effect Transistors) or MOSFETs (Metal-Oxide Semiconductor Field Effect Transistors) each incorporating a parasitic diode, diodes connected in parallel with IGBTs, or diodes connected in parallel with transistors). In the embodiment, these lower elements are configured from the MOSFETs (14d1 to 14f1) incorporating parasitic diodes 14d2 to 14f2. Note that, here, it goes without saying that the "duty-controllable diode element" or "duty-controllable switching element having diode" is not limited to the one described above.

Further, as shown in the figure, the inverter 20 of the inverter unit 22 is configured from a bridge circuit composed of upper and lower two sets (four pieces in total) of elements 20a to 20d, and in this embodiment, the four elements 20a to 20d are configured from FETs (or MOSFETs) each incorporating a diode.

In the inverter unit 22, as shown in the figure, the capacitor 16 is connected with a DC voltage detection circuit 32 for detecting a DC voltage between the positive and negative terminals thereof, and a connection circuit for connecting the three-phase windings 12a to 12c of the alternator 12 and the midpoints of the three-phase rectifying bridge circuit of the converter 14 is inserted with a phase/zero-cross detection circuit 34 for detecting the phase and zero cross of the three-phase winding at an angle. In addition, the gate terminals of the upper and lower elements 14a1 to 14f1 of the three-phase rectifying bridge circuit of the converter 14 are connected to an element drive circuit 36 which outputs an ON signal.

The inverter unit 22 includes an electronic control unit (hereinafter referred to as "ECU") 40. The ECU 40 is configured from a microcomputer including at least a processor (CPU) 40a connected via a bus, a memory (ROM, RAM) 40b, and an I/O 40c.

When the ECU 40 (more specifically, the processor 40a and the memory 40b thereof) operates as a control unit and rectifies a power generation output (AC output) of the alternator 12, the ECU 40 controls a step-up/down operation so that a detected value (DC Voltage) detected from an output of the DC voltage detection circuit 32 becomes a target DC voltage (target value) by controlling an operation of the elements 14a to 14f of the converter 14 through the element drive circuit 36 on the basis of angles of a phase and zero cross detected from the phase/zero-cross detection circuit 34.

The target DC voltage is predetermined so as to satisfy an AC voltage assumed to be required from the scheduled electric load 28. Further, a control unit 40 controls the operation of the elements 20a to 20d of the bridge circuit of the inverter 20 so as to obtain the AC voltage actually required from the electric load 28, but since the feature of the present invention is the configuration of the converter 14, the detailed description of the inverter 20 is omitted.

In this way, the converter 14, the capacitor 16, and the control unit 40 of the inverter unit 22 operate as a rectifying unit and a step-up/down unit (COV), and the inverter 20 and the control unit 40 operate as a DC/AC converting unit (INV). Further, the engine 10 and the alternator 12 operate as a power generation unit (ALT).

Next, the step-up/down operation of the power generation output of the control unit 40 described above will be described with reference to FIG. 2 and the following figures.

Figure 2:
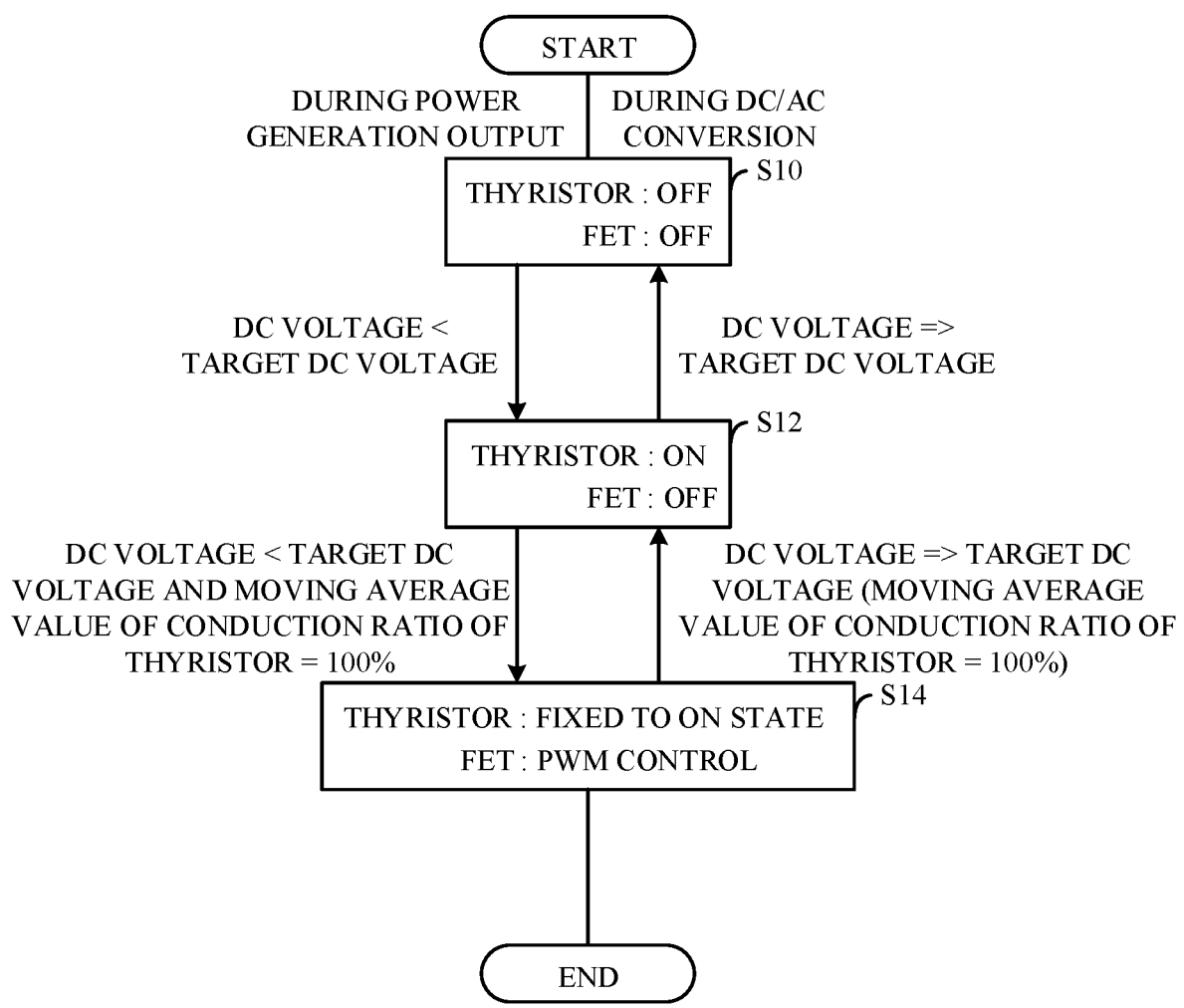
FIG. 2 is a flowchart showing the step-up/down control of the power generation output of an electronic control unit (control unit)
Figure 3:
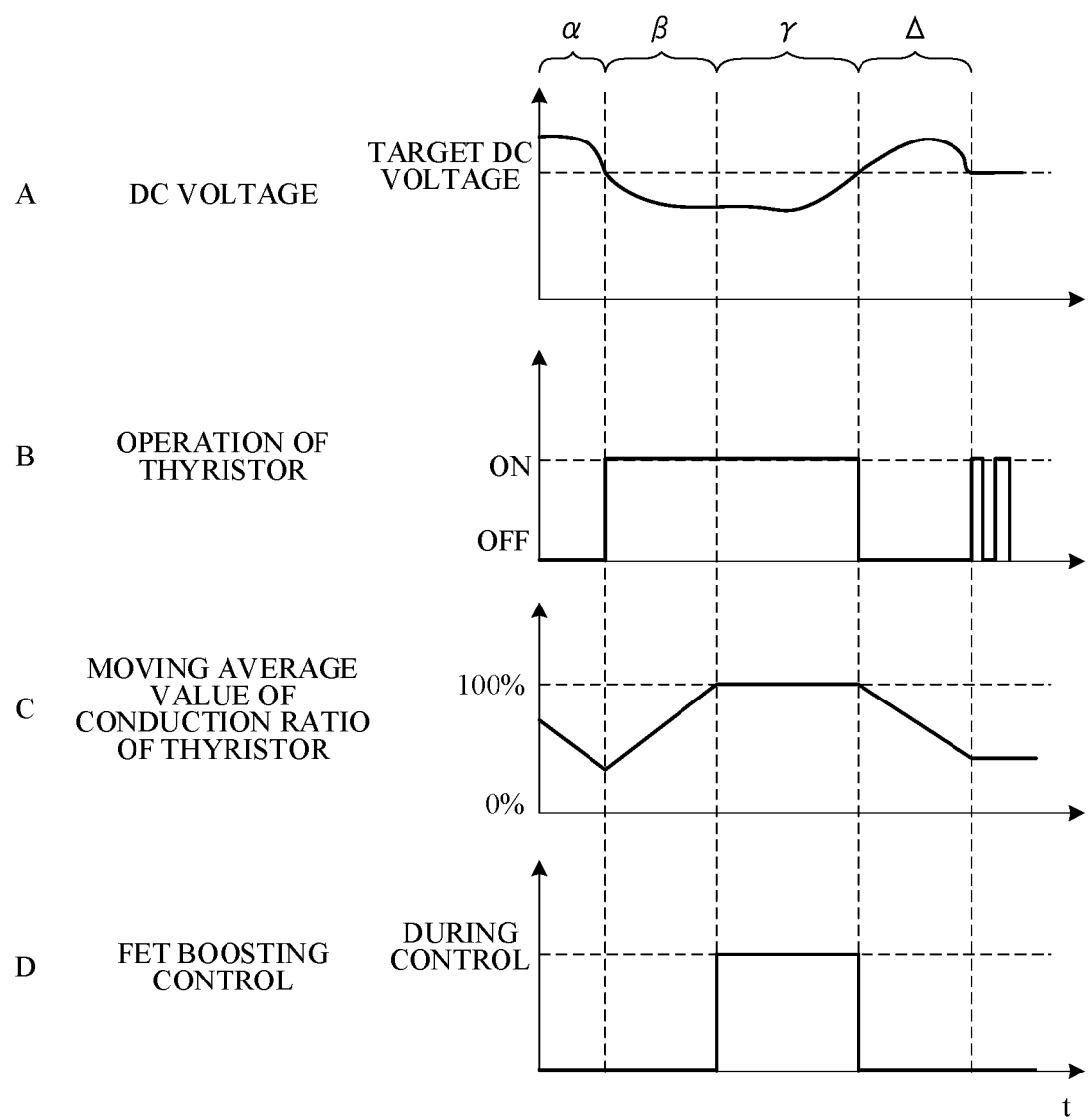
FIG. 3 is a time chart for explaining the control of FIG. 2.
Figure 4:
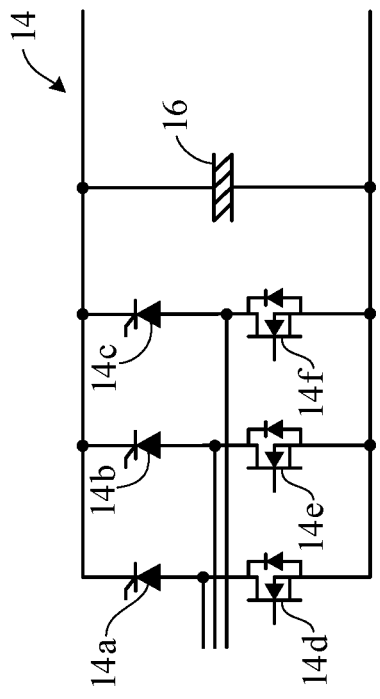
FIG. 4 is an equivalent circuit diagram of the converter of FIG. 1 showing the control of FIG. 2 as a whole.
Figure 4:
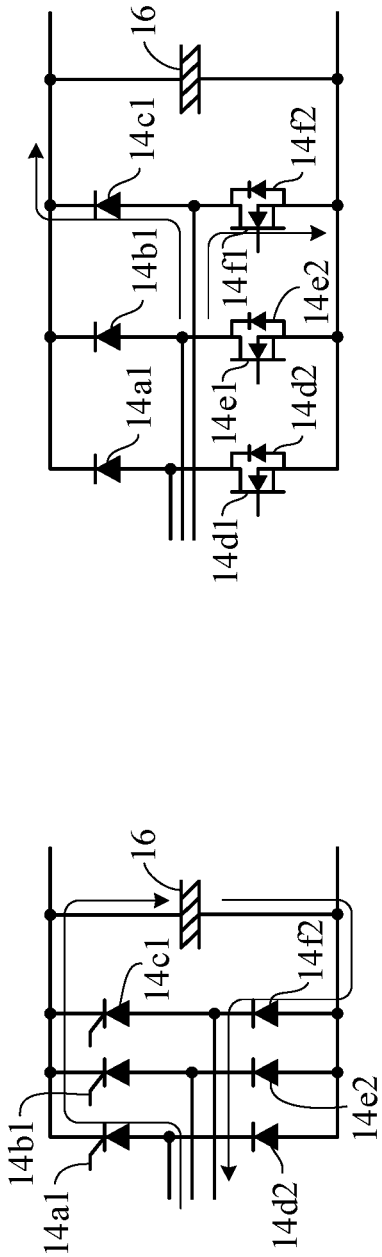
Figure 5:
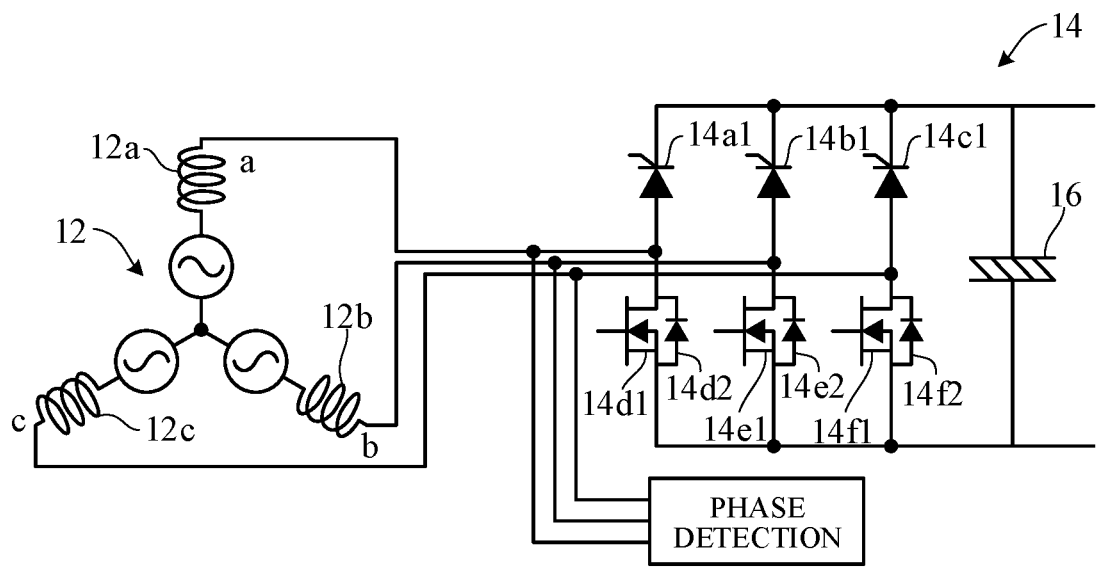
FIG. 5 is an equivalent circuit diagram of the alternator and the converter showing the principle of boosting during power generation of FIG. 4.
Figure 6:
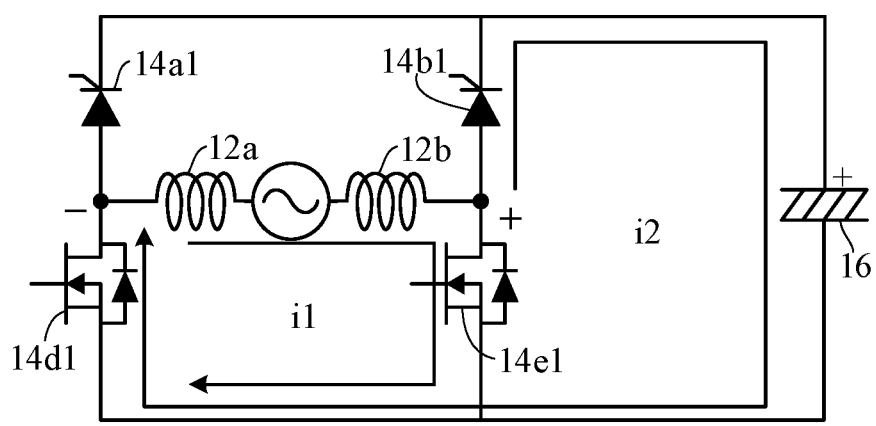
FIG. 6 is an equivalent circuit diagram with attention paid to an interlinear part of a part of the alternator of FIG. 5.

FIG. 2 is a flowchart showing the step-up/down control of the power generation output of the control unit 40, FIG. 3 is a time chart for explaining the control, FIG. 4 is an equivalent circuit diagram of the converter 14 showing them as a whole, FIG. 5 is an equivalent circuit diagram of the alternator 12 and the converter 14 showing the principle of boosting during power generation of FIG. 4, and FIG. 6 is an equivalent circuit diagram with attention paid to an interlinear part of a part of the alternator 12 shown in FIG. 5.

It will be explained with reference to FIG. 2. In step S10, the thyristors (14a1 to 14c1) of the upper elements 14a to 14c of the converter 14 are turned OFF, and the MOSFETs of the lower elements 14d to 14f (hereinafter abbreviated as "FETs") (14d1 to 14f1) are turned OFF (S: processing step). The processing of FIG. 2 is executed at predetermined intervals, for example, every 10 msec.

Next, in step S12, while the thyristors (14a1 to 14c1) are turned ON, and the FETs (14d1 to 14f1) are kept OFF.

Next, in step S14, while the thyristors (14a1 to 14c1) are fixed to the ON state, and the FETs (14d1 to 14f1) are PWM (Pulse Width Modulation) controlled. The ON/OFF control of the thyristor and the FET is performed through the element drive circuit 36.

The processing of the flowchart of FIG. 2 will be explained according to the time chart of FIG. 3. The processing in S10 is a preparation process before the period α of the time chart of FIG. 3, in which the operation of the element is reset to the initial state and the DC voltage (detected value) and the target DC voltage (target value) are compared.

If it is now in the period a, as shown in FIG. 3, since the DC voltage exceeds the target DC voltage, by continuing the processing in S10, the moving average value of the conduction ratio of the thyristors (14a1 to 14c1) gradually decreases. Since the moving average value of the conduction ratio of the thyristor is a ratio of the ON time of the thyristor at a fixed time, as the processing in S10 is continued, the moving average value decreases with time as shown in FIG. 3.

In FIG. 3, since the DC voltage coincides with the target DC voltage at the end of the period α and becomes lower than the target DC voltage in the subsequent period β, the process proceeds processing in S12. That is, as shown in FIG. 3, the operation of the thyristors (14a1 to 14c1) is changed from OFF to ON, and as a result, as shown in FIG. 3, the moving average value of the conduction ratio of the thyristor is changed to increase. The ON/OFF control (duty control) of the thyristor is exaggerated at the subsequent period after period Δ.

Since the conduction ratio is saturated in the following period γ, the process proceeds to S14, in which the duty control of the FETs (14$d$1 to 14$f$1) is performed while the thyristors are fixed to the ON state, thereby boosting the DC voltage. Here, the duty control means a control for varying the duty for turning on the FETs (14$d$1 to 14$f$1) in accordance with the deviation between the target DC voltage (target value) and the DC voltage (detected value) so as to bring the detected value closer to the target value.

This boosting control will be described later in detail.

As a result, as shown in FIG. 3, since the detected DC voltage exceeds the target DC voltage in the period Δ, the process returns to processing in S10 again, and the above processing is repeated.

Note that, in the case where the lower elements 14$d$ to 14$f$ of the converter 14 are configured from the IGBTs and diodes instead of the FETs, PWM control of the FET in S14 means PWM control of the IGBT. The choice between FET and a set of IGBT diode depends on the current and voltage used.

Then, referring to FIG. 4, the control illustrated in FIGS. 2 and 3 will be amplified.

In the case where step-down is performed during power generation as shown at the left end of FIG. 4, since the IGBT and FET are turned off as shown in the processing of S10 and S12, the power generation output (electric current) of one phase of the three-phase power generation output flows through the upper thyristors (14$a$1 to 14$c$1) and the parasitic diodes (14$d$2 to 14$f$2) of the lower FETs (14$d$1 to 14$f$1) as shown by an arrow. At this time, by lowering the conduction ratio of the thyristor as shown in FIG. 3, the power generation output can be stepped down to bring the DC voltage close to the target DC voltage.

In the case where boosting is performed during power generation as shown in the right end of FIG. 4, as shown in the processing of S12 and S14, while the thyristors (14$a$1 to 14$c$1) are fixed to the ON state, the FETs (14$d$1 to 14$f$1) are controlled to boost the voltage by using the inductance L of the three-phase winding 12$a$ of the alternator 12. When one phase of the three-phase power generation output is focused on, the current flows as indicated by the arrow.

The boosting control will be further explained with reference to FIG. 5, which is an equivalent circuit diagram of the three-phase windings 12$a$, 12$b$, 12$c$ of the alternator 12 and the converter 14. FIG. 6 is an equivalent circuit diagram focusing only on the portion between the a-b lines of the three-phase winding 12$a$.

In general, this control uses the thyristors (14$a$1 to 14$c$1) as diodes while the thyristors (14$a$2 to 14$c$2) are fixed to the ON state, and combines the control of the three-phase winding 12$a$ and that of the FETs (14$d$1 to 14$f$1), thereby enabling boosting control of voltage by DC while rectifying.

That is, during boosting, the thyristor (14$a$1) is always applied with an ON signal at the gate terminal and used as a diode. When the FET (14$d$1) is turned on when the power generation output is generated, the current flows like i1, and magnetic energy is stored in the inductance of the three-phase winding 12$a$.

Next, when the FET (14$e$1) is turned OFF, the current flows as i2. That is, as a result of the release of the magnetic energy stored in the three-phase winding 12$a$, the power generation output is raised by the amount of the current i2 and boosted. Therefore, by performing duty control of the FETs (14$d$1 to 14$e$1) of the three-phase rectifying bridge circuit, it is possible to boost the DC voltage to a voltage required for the power generation output.

The timing of supplying the ON signal to the gate terminals of the FETs (14$d$1 to 14$e$1) is controlled by detecting the phase of the waveform from the output of the phase/zero-cross detection circuit of FIG. 1 and controlling it with the optimum phase through the element drive circuit 36. Note that, when the elements (14$d$1 to 14$f$1) are configured from IGBTs and diodes instead of FETs, the duty control of the IGBT is performed as described above.

In the generator according to this embodiment, the upper and lower three sets of elements 14$a$ to 14$f$ of the three-phase rectifying bridge circuit of the converter 14 are configured such that the upper elements 14$a$ to 14$c$ are configured from duty-controllable diode elements (for example, thyristors) (14$a$1 to 14$c$1), and the lower elements 14$d$ to 14$e$ are configured at least from duty-controllable switching elements each having a diode (for example, FETs 14$d$1 to 14$f$1 incorporating parasitic diodes 14$d$2 to 14$f$2 and so on), so that, in the converter 14, the rectifying circuit and the step-up/down circuit can be realized by one three-phase bridge circuit.

Here, advantages in the rotation speed of the generator 1 of this embodiment will be described with reference to FIGS. 7 to 10.

Figure 7:
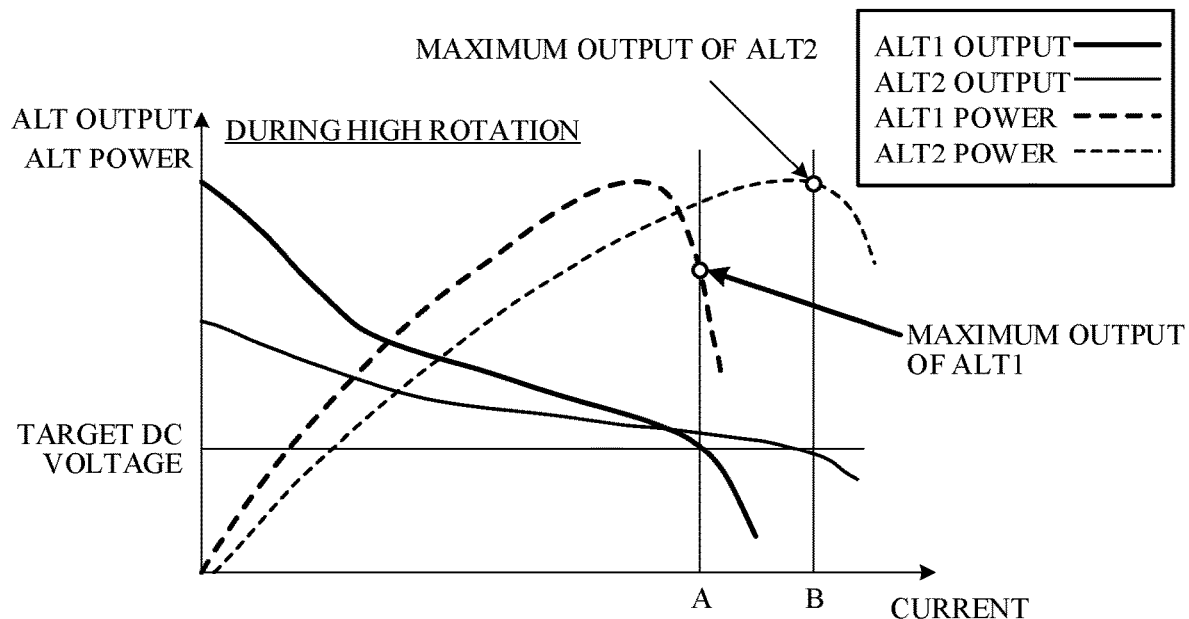
FIG. 7 is an explanatory diagram showing a voltage and output characteristics for high rotation when the number of winding of the alternator of FIG. 1 is set to ALT1 and ALT2.

When alternators having different numbers of windings using the same core are set to ALT1 and ALT2 (number of windings: ALT1>ALT2), the voltage and output characteristics are as shown in FIG. 7 for high rotation and FIG. 8 for low rotation, for example. Further, FIG. 9 shows the output increase by the step-up rectification of ALT2 during low rotation, and FIG. 10 shows the output increase by the step-up rectification of ALT2 during extremely low rotation.

Figure 8:
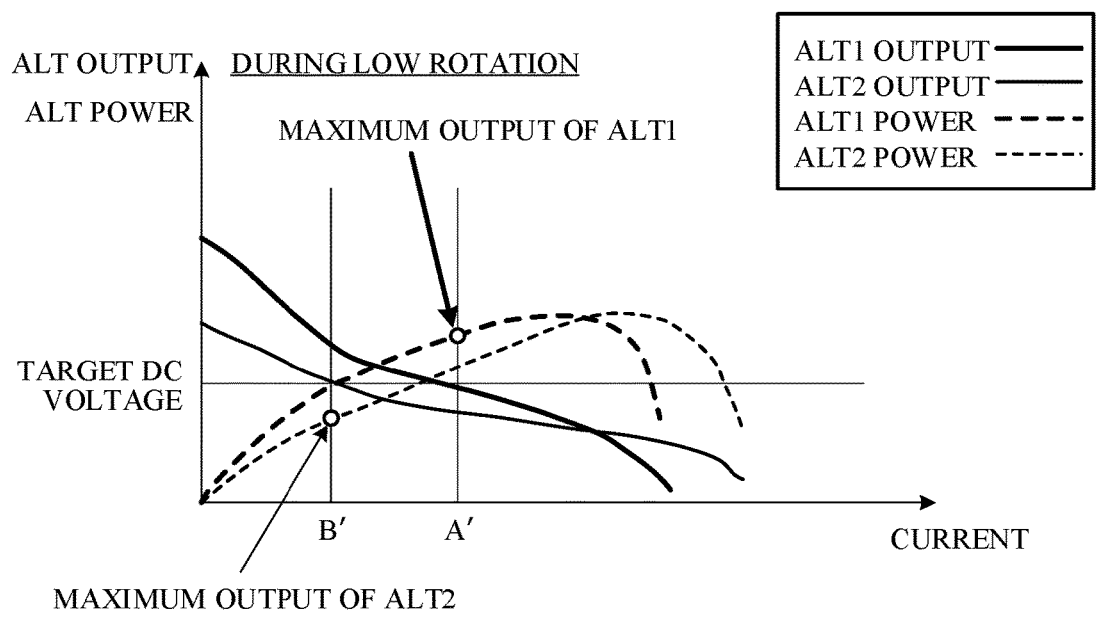
FIG. 8 is an explanatory diagram showing a voltage and output characteristics for low rotation in FIG. 7.

Although the output of the ALT2 is large and desirable during high rotation as shown in FIG. 7, a voltage of the target DC voltage or higher is required when reducing the DC voltage, and the ALT1 can secure the required output during low rotation as shown in FIG. 8.

Figure 9:
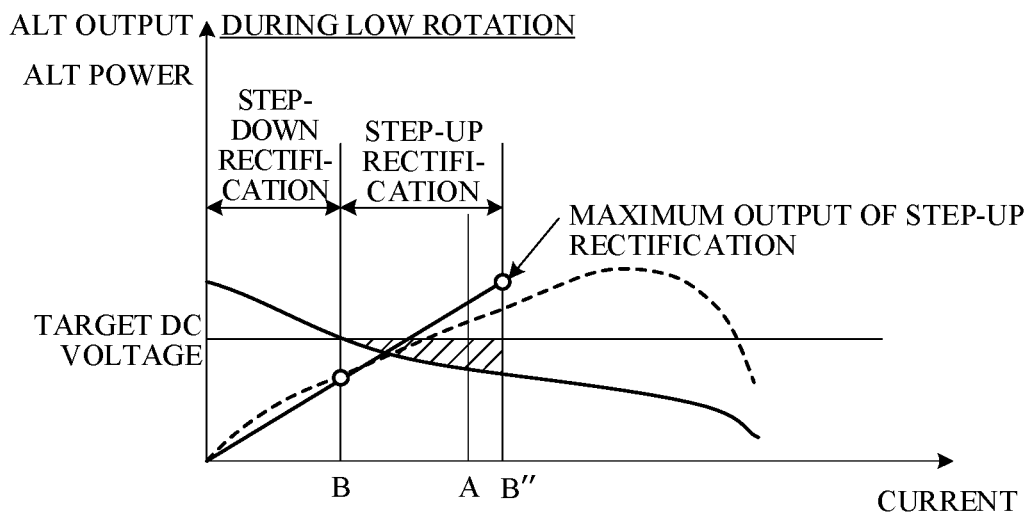
FIG. 9 is an explanatory diagram showing the output increase by the step-up rectification of ALT2 during low rotation in FIG. 7.

However, when the DC step-up/down operation is enabled as described in this embodiment, the number of windings is set so that the maximum peak point of the output of the alternator 12 can be secured at the maximum rotation speed of ALT2, and as shown in FIG. 9, step-up rectification is performed during low rotation to secure the necessary voltage, so that the power generation output can be used up to the output peak of the alternator 12 at the rotation speed.

Figure 10:
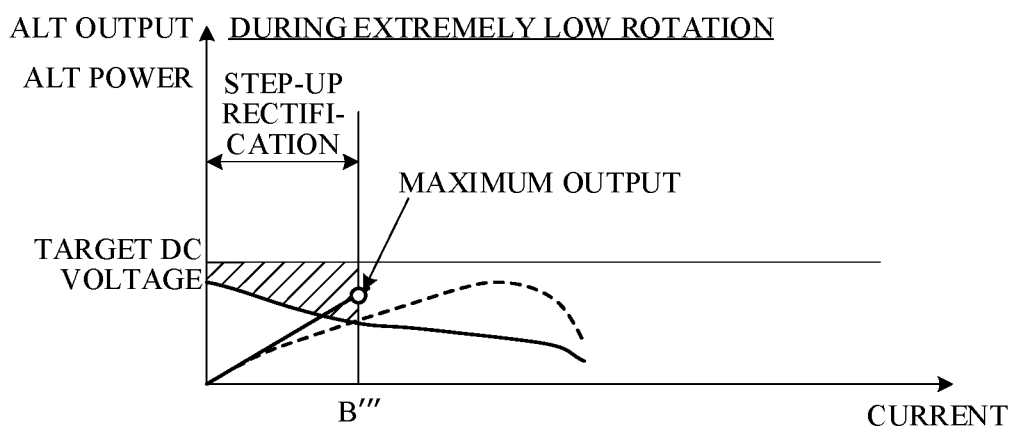
FIG. 10 is an explanatory diagram showing the output increase by the step-up rectification of ALT2 during extremely low rotation in FIG. 7.

Further, as shown in FIG. 10, even during extremely low rotation when the alternator voltage does not reach the target DC voltage, the voltage can be secured by executing the step-up rectification described with reference to FIGS. 2 to 4, so that the output required from the electric load 28 can be obtained. As a result, it is possible to further reduce the idle rotation speed during light load, and it is possible to suppress the rotation speed of the engine 10 to be low, and it is possible to obtain a large advantage in terms of noise, fuel consumption, etc.

As described above, in the generator 1 according to this embodiment, as the winding specifications of the alternator 12 in accordance with the maximum rotation speed and the maximum output point, the maximum output and the output in the low rotation range can be compatible with each other by the alternator 12 of the same size, and the restriction of the winding specifications of the alternator 12 can be reduced.

Further, in the case of only step-up rectification, it is necessary to set the alternator voltage to be lower than the target DC voltage in the entire output range of low rotation and high rotation, but since the step-up ratio has a limit, the DC voltage may not reach the target DC voltage because it cannot be boosted at the maximum output of low rotation. Also from this point of view, the rectification method capable of performing both the step-up and step-down in this embodiment has a great advantage.

Second Embodiment

FIG. 11 is an electric circuit diagram similar to FIG. 1, which shows the generator 1 according to the second embodiment of the present invention as a whole.

Focusing on the difference from the first embodiment, in the second embodiment, an electric motor 10a is used instead of the engine 10 as a rotary motor. The remaining configuration and effect are not different from those of the first embodiment.

As described above, in the first and second embodiments, in the inverter type engine generator 1 including: the alternator 12 which has three-phase windings 12a, 12b, 12c, is driven by a rotary motor (engine 10 or electric motor 10a) to generate power; the converter 14 which is composed of a three-phase rectifying bridge circuit having upper and lower three sets of elements 14a to 14f and converts three-phase alternating current output from the alternator 12 into direct current; and the converter control unit (ECU 40) which controls driving of the elements 14a to 14f of the three-phase rectifying bridge circuit so that the DC terminal voltage (DC Voltage) output from the converter 14 becomes a target voltage (DC target voltage), since the upper and lower three sets of elements of the three-phase rectifying bridge circuit of the converter 14 are configured such that the upper elements are configured at least from the duty-controllable diode elements (for example, thyristors) (14a1 to 14c1), and the lower elements are configured at least from the duty-controllable switching elements with diodes (FETs or IGBTs and diodes, or transistors and parallel diodes, for example, MOSFETs (14d1 to 14f1) incorporating parasitic diodes 14d2 to 14f2), it is possible to realize the rectifying circuit and the step-up/down circuit by one three-phase bridge circuit.

Further, since it is not necessary to add a step-up/down circuit in addition to a rectifying circuit, it is possible to supply a constant DC voltage during power generation without increasing the size, weight and number of parts.

Further, as described with reference to FIGS. 7 to 10, since both step-up and step-down can be coped with during power generation, the output of the alternator 12 can be secured to the maximum in a wide rotation speed range, and the alternator 12 can comply with a winding specification capable of securing the maximum output with the same core, and furthermore, the rotation speed during load standby (In other words, during no load) can be made lower than the idle rotation speed of the conventional step-down rectification method.

Further, since the converter control unit is configured to control the driving of the upper and lower three sets of elements 14a to 14f so that the DC terminal voltage output from the three-phase bridge circuit becomes the target voltage, the step-up/down control can be effectively performed in addition to the effects described above.

Further, since the converter control unit is configured to compare the detected value (DC Voltage) of the DC terminal voltage output from the three-phase bridge circuit with a target value (target DC voltage), and control the driving of the upper and lower three sets of elements 14a to 14f according to the result of the comparison between the detected value and the target value (S10 to S14), the step-up/down control can be more effectively performed in addition to the effects described above.

When the detected value (DC Voltage) of the output DC terminal voltage is less than the target value (target DC voltage), the converter control unit is configured to turn on the upper duty-controllable diode elements 14a1 to 14c1 of the upper and lower three sets of elements 14a to 14f, and to control the duty of the lower duty-controllable elements 14d1 to 14f1, so that the output voltage of the three-phase bridge circuit increases by an electromotive force caused by magnetic energy generated in the three-phase winding, so that the DC voltage can be boosted to a voltage equivalent to magnetic energy exceeding the power generation output in addition to the effects described above.

When the detected value (DC Voltage) of the output DC terminal voltage exceeds the target value (target DC voltage), the converter control unit is configured to turn off the lower duty-controllable elements 14d1 to 14f1 of the upper and lower three sets of elements 14a to 14f and control the duty of the upper duty-controllable diode elements 14a1 to 14c1 so that the output voltage of the three-phase bridge circuit is reduced, so that the DC voltage can be reduced to a desired voltage in addition to the effects described above.

Further, since the rotary motor is configured to include a general-purpose engine 10 or an electric motor 10a, in addition to the effects described above, even when the engine 10 or the electric motor 10a is used as the rotary motor, the rotary motor can be the rectifying circuit and the step-up/down circuit by one three-phase bridge circuit.

INDUSTRIAL APPLICABILITY

The inverter type generator according to the present invention can be suitably used for a generator driven by a rotary motor such as an engine.

REFERENCE SIGNS LOST 1 inverter type engine generator (generator), 10 engine (rotary motor), 12 alternator, 14 converter, 14a to 14f element, 14a1 to 14c1 thyristor, 14d1 to 14f1 MOSFET (FET), 14d2 to 14f2 diode, 16 capacitor, 20 inverter, 22 inverter unit, 28 electric load, 30 battery (power source), 32 DC voltage detection circuit, 34 phase/zero-cross detection circuit, 36 element drive circuit, 40 electronic control unit (ECU. control unit), 40a CPU, 40b memory.

The invention claimed is:

1. An inverter type engine generator comprising:
an alternator having three-phase windings and driven by a rotary motor to generate power;
a converter composed of a three-phase rectifying bridge circuit having upper and lower three sets of elements, and converting a three-phase alternating current output from the alternator into a direct current; and
a CPU and a memory coupled to the CPU, wherein
the CPU and the memory are configured to perform comparing a detected value of a direct-current terminal voltage output from the converter with a target voltage, and controlling driving of the upper and lower three sets of elements according to the result of comparison between the detected value and the target voltage, and
the upper and lower three sets of elements are configured such that upper elements are configured at least from duty-controllable diode elements, and lower elements are configured at least from duty-controllable switching elements having diodes, and wherein the CPU and the memory are configured to perform
the controlling including, when the detected value of the direct-current terminal voltage output from the converter is less than the target voltage, turning on the duty-controllable diode elements of the upper elements, and controlling a duty of the duty-controllable switching elements of the lower elements so that an output voltage of the three-phase rectifying bridge circuit increases by an electromotive force caused by a magnetic energy generated in the three-phase windings, and further including varying the duty for turning on the duty-controllable switching elements of the lower elements in accordance with a deviation between the target voltage and the detected value so as to bring the detected value closer to the target voltage, when the detected value of the direct-current terminal voltage output from the converter is less than the target voltage.

2. The inverter type engine generator according to claim 1, wherein
the CPU and the memory are configured to perform controlling driving of the upper and lower three sets of elements so that the direct-current terminal voltage output from the converter becomes the target voltage.

3. The inverter type engine generator according to claim 1, further comprising
a detection circuit configured to detect a phase and a zero cross of the three-phase alternating current output from the alternator, wherein
the controlling includes controlling the duty of the lower duty-controllable switching elements of the lower elements based on the phase and the zero cross detected by the detection circuit.

4. The inverter type engine generator according to claim 1, wherein
the CPU and the memory are configured to perform
the controlling including, when the detected value of the direct-current terminal voltage exceeds the target voltage, turning off the duty-controllable switching elements of the lower elements and controlling the duty of the duty-controllable diode elements of the upper elements, so that an output voltage of the three-phase rectifying bridge circuit is reduced.

5. The inverter type engine generator according to claim 1 wherein
the duty-controllable diode elements of the upper elements are thyristors.

6. The inverter type engine generator according to claim 1 wherein
the duty-controllable switching elements of the lower elements are Field Effect Transistors, diodes connected in parallel with Integrated Gate Bipolar Transistors, or diodes connected in parallel with transistors.

7. The inverter type engine generator according to claim 1, wherein
the rotary motor includes a general-purpose engine or an electric motor.

* * * * *